United States Patent
Pulici et al.

(10) Patent No.: US 9,712,060 B2
(45) Date of Patent: Jul. 18, 2017

(54) METHOD FOR MANAGING A PLURALITY OF HYSTERETIC DC-DC BUCK CONVERTERS AND CORRESPONDING DC-DC BUCK CONVERTER

(71) Applicant: STMICROELECTRONICS S.R.L., Agrate Brianza (IT)

(72) Inventors: Paolo Pulici, Legnano (IT); Massimo Mazzucco, Savona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/087,082

(22) Filed: Mar. 31, 2016

(65) Prior Publication Data

US 2017/0085180 A1    Mar. 23, 2017

(30) Foreign Application Priority Data

Sep. 22, 2015 (IT) .................. 102015000053981

(51) Int. Cl.
    *H02M 3/158* (2006.01)
    *H02M 1/08* (2006.01)
    *G05F 1/46* (2006.01)

(52) U.S. Cl.
    CPC .......... *H02M 3/1584* (2013.01); *H02M 1/08* (2013.01); *G05F 1/46* (2013.01)

(58) Field of Classification Search
    CPC .............................. G05F 1/468; H02M 3/1584
    See application file for complete search history.

(56) References Cited

U.S. PATENT DOCUMENTS

| | | | |
|---|---|---|---|
| 6,147,478 A | 11/2000 | Skelton et al. | |
| 8,008,902 B2* | 8/2011 | Melanson | H02M 3/1563 323/285 |
| 8,907,644 B2* | 12/2014 | Menegoli | H02M 3/158 323/271 |
| 9,362,828 B2* | 6/2016 | Peker | H02M 3/1582 |

(Continued)

FOREIGN PATENT DOCUMENTS

WO        2009/138908 A1    11/2009

OTHER PUBLICATIONS

Kazimierczuk, *Pulse-width Modulated DC-DC Power Converters*, John Wiley and Sons, Ltd, West Sussex, United Kingdom, 2008, pp. 1-83. (99 pages).

(Continued)

*Primary Examiner* — Emily P Pham
(74) *Attorney, Agent, or Firm* — Seed IP Law Group LLP

(57) ABSTRACT

A method manages hysteretic DC-DC buck converters each including a hysteretic comparator operating according to a respective hysteresis window. The method includes, in a given converter, verifying if a respective feedback voltage reaches a lower threshold in order to enter a switch-on period of the converter, The method comprises: while the verifying indicates that the lower threshold is not reached, detecting if another converter has entered a respective switch on period and, in the affirmative, entering a hysteresis voltage adjustment procedure, include increasing by a given amount the amplitude of the hysteresis window of the given converter by reducing the lower threshold of the hysteresis window.

21 Claims, 14 Drawing Sheets

(56) References Cited

U.S. PATENT DOCUMENTS

| | | | |
|---|---|---|---|
| 2003/0090244 A1* | 5/2003 | Shenai | G06F 1/3203 |
| | | | 323/259 |
| 2004/0120169 A1 | 6/2004 | Schrom et al. | |
| 2012/0161728 A1* | 6/2012 | Chen | H02M 3/1563 |
| | | | 323/271 |

OTHER PUBLICATIONS

Miftakhutdinov, "Analysis and Optimization of Synchronous Buck Converter at High Slew-Rate Load Current Transients," 2000 *IEEE 31st Annual Power Electronics Specialists Conference*, pp. 714-720, 2000.

Nabeshima et al. "Analysis and Design Considerations of a Buck Converter with a Hysteretic PWM Controller," 2004 *35th Annual IEEE Power Electronics Specialists Conference*, pp. 1711-1716, 2004.

* cited by examiner

US 9,712,060 B2

METHOD FOR MANAGING A PLURALITY OF HYSTERETIC DC-DC BUCK CONVERTERS AND CORRESPONDING DC-DC BUCK CONVERTER

BACKGROUND

Technical Field

The present description relates to techniques for managing a plurality of hysteretic DC-DC buck converters arranged to create multiple output voltages with different point of loads or to provide a common supply current to a common load, each of said hysteretic DC-DC buck converters comprising a hysteretic comparator operating according to a respective hysteresis window.

Various embodiments may apply, e.g., to managing hysteretic converters placed on a same die or chip, DC-DC regulators, supply for power combo for hard disks.

Description of the Related Art

DC-DC buck converters are widely used to supply a lot of kinds of electronic systems, including microprocessor units (MPUs), memories and chip sets on board, because of the small size and high efficiency of such DC-DC buck converters. Due to the several applications involved, several different control loops have been designed in order to meet the specifications in terms of speed, power consumptions, output voltage accuracy. Hysteretic buck converters are well suited for microprocessor supply mainly due to their fast response to the high load current slew rate steps, maintaining the regulated output voltage. FIG. 1 shows a basic configuration of DC-DC buck converter with a hysteretic PWM controller according to the prior art. The architecture is quite simple, as the converter 10 is basically an oscillator, generating a feedback triangular waveform Vfb to be compared to a reference voltage $V_R$ through a hysteretic comparator 11, as depicted in FIG. 2.

Basically, a battery 12 generates an input voltage Vi which is coupled to an input node SW of an inductor 13 having an equivalent series resistor 15, with a resistance value $R_{ESRL}$, through a series switch 14a, i.e., a high side power FET, and a switch 14b, a low side power FET, connected to ground GND. The input node SW is thus a switching node, between the input voltage Vi and the ground GND. An output node O of the inductor 13 and series resistor 15 oscillating pair represents also the output node of the converter 10 at which an output voltage $V_o$ is formed. Between the output node O and ground GND is connected an output capacitor 16 with an equivalent series resistor 17 having a resistance value $R_{ESRC}$. In parallel to the capacitor 16 and series resistor 17 is connected an output resistance 19, i.e., a load, with a value R. The output node O is also connected to the positive input of the hysteretic comparator 11, while its negative input is connected to the reference voltage $V_R$, supplied by a reference generator 18. The output signal of the hysteretic voltage 11 is sent to a driver 20 which, depending on the level of the output signal of the hysteretic voltage 11, issues a PWM (pulse width modulation) driving signal Q to the series switch 14a and its negated $\bar{Q}$ to the parallel switch 14b.

The triangular feedback waveform $V_{fb}$, which in the case of FIG. 1 corresponds to the output voltage $V_o$, but in general represents a feedback signal fed back through a feedback network in the feedback loop represented by the hysteretic comparator 11 and driver 20, is typically created by the equivalent series resistor 17 with value $R_{ESRC}$ of the output capacitor 16.

For a continuous conduction mode, which means there is not a period of time in which the inductor current is continuously equal to zero, this kind of a regulator has a switching frequency $F_{SW}=1/T_{SW}$, where $T_{SW}$ is the period of the switching voltage $V_{SW}$ at the input node SW, that is based on a combination of the input voltage $V_I$, the output voltage $V_O$, the inductance value L of the inductor 13, and the output capacitor series resistor 17 value, $R_{ESRC}$. This resistor 17 generates the triangular feedback waveform $V_{fb}$, in combination with an inductor current $I_L$ going through the capacitor 16 from the inductor 13. The feedback waveform $V_{fb}$ is compared with the comparator reference voltage VR by the comparator 11, in a way similar to a conventional fixed frequency voltage mode regulator. The operation of the circuit of FIG. 1 results in the following relationships for the switch-on period $T_{ON}$, the switch-off period $T_{OFF}$ and the switching period $T_{SW}$ of the voltage Vt in continuous current mode:

$$T_{ON} = \frac{V_{HYST}}{V_I - V_O} \frac{L}{R_{ESRC}}$$

$$T_{OFF} = \frac{V_{HYST}}{V_O} \frac{L}{R_{ESRC}}$$

$$T_{SW} = T_{ON} + T_{OFF} = \frac{V_{HYST} V_I}{(V_I - V_O) V_O} \frac{L}{R_{ESRC}}$$

where $V_{HYST}$ is the amplitude of the hysteresis window, between a lower threshold $V_{THL}$ and higher threshold $V_{THH}$. A good, i.e., stable, control is reached when the voltage across the series resistor 17 is much bigger than the ripple of the capacitor 16.

In modern electronics, to reduce the size of the printed circuit boards and the costs of the materials, small ceramic capacitors with very low equivalent series resistance (ESR) are commonly used; in this case the ripple of the capacitor becomes dominant on the ripple on the series resistance $R_{ESRC}$ and the controller will tend to a LC resonant filter, with its typical phase delay and oscillating behavior.

In general the triangular feedback voltage $V_{fb}$, which is fed back to the hysteretic comparator, can differ with respect to output voltage $V_o$ since, for instance it is known to add a simple passive ripple reconstruction network, inserting a resistor and capacitor, in parallel with the inductor winding, as disclosed in Nabeshima, T. Sato, S. Yoshida, S. Chiba and K. Onda, *"Analysis and Design Considerations of a Buck Converter with a Hysteretic PWM controller"* in Proceedings of Power Electronics Specialists Conference, pp. 1711-1716, 2004. In such a circuit the switching frequency is affected by the delay of the comparators and the drivers and it is also affected by the finite on resistance of the power FET (such as the switches 14a and 14b shown in FIG. 1)

When more than one hysteretic DC-DC converter is included in the same die, due to internal noise (for instance mutual inductances among bonding wires, or kick-back noise on the reference voltages when regulators are switching) or due to external noise (i.e., coupling among the PCB tracks or among inductors), such converters tend to switch together, increasing the peak and RMS supply current coming from voltage $V_I$ and, consequently, the EMI (electromagnetic interference) and the power supply bouncing (considering that interconnections are present between the input voltage $V_I$ and the high side power FETs).

In FIG. 3 is shown a time diagram illustrating the effect on the supply current of two switching converters, or regulators, such as the converter of FIG. 1, commutating at the same time. With Vfb1 is indicated the feedback voltage of a first converter, while with Vfb2 is indicated the triangular feedback voltage of a second converter. $I_s$ indicates the supply current provided from the battery (or the main input supply) to such two regulators jointly. As shown in FIG. 3, due to noise, the two converters tend to switch synchronously at a time t1 at which the switch-on period $T_{ON}$. This generates a spike and then a decrease of the supply current Is, while such supply current $I_s$ should more evenly distributed along the switching period. Furthermore, especially in DCM (discontinuous conduction modes) condition, the synchronized behavior could even cause a DC shift in the output voltage due to such a coupling.

The electrical simulation results of the interaction between two hysteretic DC-DC converters due to noise coupling, injected on the feedback Vfb2 of the second generator by the switching node SW of the first generator are shown in FIG. 4. In particular, in FIG. 4 are shown the time diagrams of the voltages at the switching node for each regulator respectively, VSW1 and VSW2, the inductor currents $I_{L1}$ and $I_{L2}$ through the respective inductors (like inductor 13 in FIG. 1), and the total supply current $I_s$. The time window in FIG. 4 is divided in two sub-windows, a first sub-window D, for DCM (discontinuous conduction modes), and a second subwindow C, for CCM (continuous current mode).

Both in DCM and in CCM modes each switch on of the high side power FET, i.e., switch 14a in FIG. 1, of the first DC-DC converter triggers the switch on of the high side power FET of the second DC-DC converter, making them synchronized.

The resulting peak and RMS supply current $I_s$ are obviously increased with respect to not-synchronized behavior.

Document U.S. Pat. No. 6,147,478 A deals with such problem, proposing a solution directed to interleaving several hysteretic DC-DC converters in a single die. Such a solution basically provides adding a clock signal in order to trigger a switch-on period $T_{ON}$ of the desired switching regulator at the desired frequency. The clock frequency has to be chosen higher than the maximum switching frequency that the hysteretic DC-DC converter can reach, which, as mentioned, is function of the input voltage, the output voltage, the $R_{DSON}$ of the FET switches of the half bridge and the ESR of the inductor.

If the clock frequency is lower than the maximum natural switching frequency of the hysteretic DC-DC converter sub-harmonic oscillations can occur, and the inductor current ripple increases as the ripple of the output voltage.

BRIEF SUMMARY

One or more embodiments of the present disclosure provide a method for managing a plurality of hysteretic DC-DC buck converters that solves the drawbacks of the prior art and in particular allows using several hysteretic DC-DC converters in a single die without the need of adding a clock signal with a high frequency.

The claims form an integral part of the technical teaching provided herein in relation to the various embodiments.

According to at least one embodiment of the present disclosure, the method includes, while the operation of verifying if a respective feedback voltage reaches a lower threshold indicates that the lower threshold is not reached, detecting if at least another converter in said plurality of converters has entered a respective switch on period and, in the affirmative, entering a hysteresis voltage adjustment procedure, comprising a step of increasing by a given amount the amplitude of the hysteresis window of at least the given converter by reducing the lower threshold of the hysteresis window.

In some embodiments, the hysteresis voltage adjustment procedure or includes, after said step or of increasing of a given amount the amplitude of the hysteresis window, verifying in a step if the feedback voltage of the given converter now reaches the lower threshold, and in the affirmative increasing a higher threshold of the hysteresis window.

In some embodiments, the method includes subsequently verifying if the switch-on period, of the other converter is complete and, in the affirmative, restoring the lower threshold.

In some embodiments, said step of verifying if the feedback voltage of the given converter now reaches the lower threshold gives a negative result, includes subsequently verifying if the switch-on period of the other converter is complete and, in the affirmative, restoring in a step the lower threshold.

In some embodiments, the hysteresis voltage adjustment procedure includes detecting if a further converter different from said other converter has entered a respective switch-on period and, in the affirmative, performing a further instance of the hysteresis voltage adjustment procedure.

In some embodiments, in each further instance of the hysteresis voltage adjustment procedure the step of increasing a higher threshold of the hysteresis window is performed by adding a further given voltage amount to a given voltage given amount added in the first instance.

In various embodiments, the solution described herein is also directed to a DC-DC buck converter comprising a plurality of hysteretic DC-DC buck converters arranged to create multiple output voltages with different point of loads or to provide a common supply current to a common load, each of said hysteretic DC-DC buck converters comprising a hysteretic comparator, characterized in that each of said hysteretic DC-DC buck converters is associated with a respective control circuit configured to perform the method described.

In various embodiments, the solution described herein is also directed to a DC-DC buck converter where said control circuit comprise a synchronizing logic circuit to detect the reaching of a switch on period of a converter in said plurality of converters, said synchronizing logic circuit being configured to command an actuation circuit, increasing the amplitude of the hysteresis window of the respective converter.

In various embodiments, the solution described herein is also directed to a DC-DC buck converter where said logic circuit receives as input the PWM signals of the plurality of converters and it is configured to detect the reaching of the switch on period from said PWM signals and issue activation signals of an actuation circuit configured to increase said amplitude of the hysteresis window of a respective converter, in particular from a normal value to an enlarged value.

In various embodiments, the solution described herein is also directed to a DC-DC buck converter where said plurality of hysteretic DC-DC buck converters is arranged on a same chip or die.

BRIEF DESCRIPTION OF THE SEVERAL VIEWS OF THE DRAWINGS

The solution will now be described purely by way of a non-limiting example with reference to the annexed drawings, in which.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Figure 1:
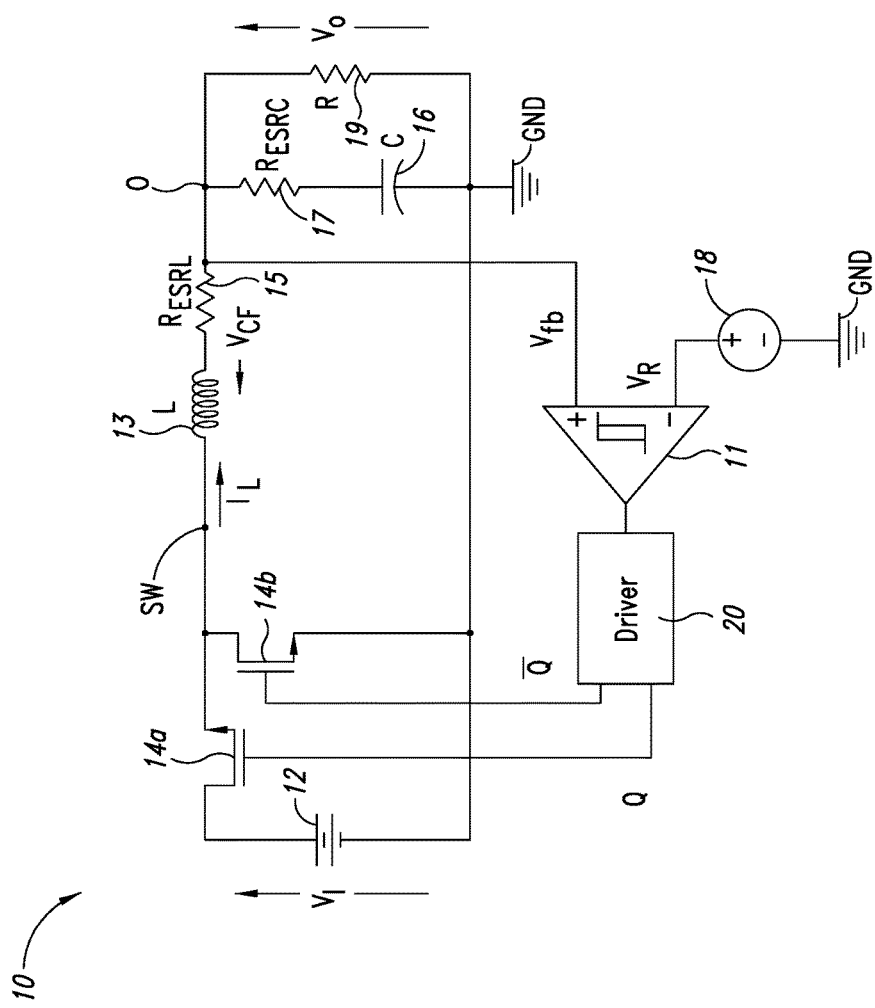
FIGS. 1, 2, 3 and 4 have been already described in the foregoing.
Figure 2:
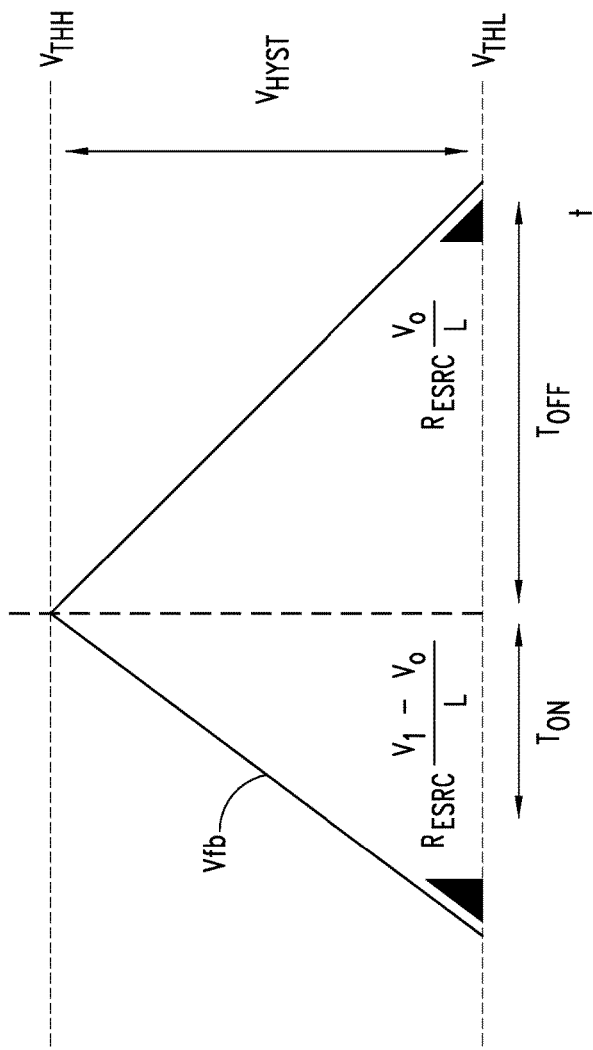
Figure 5A:
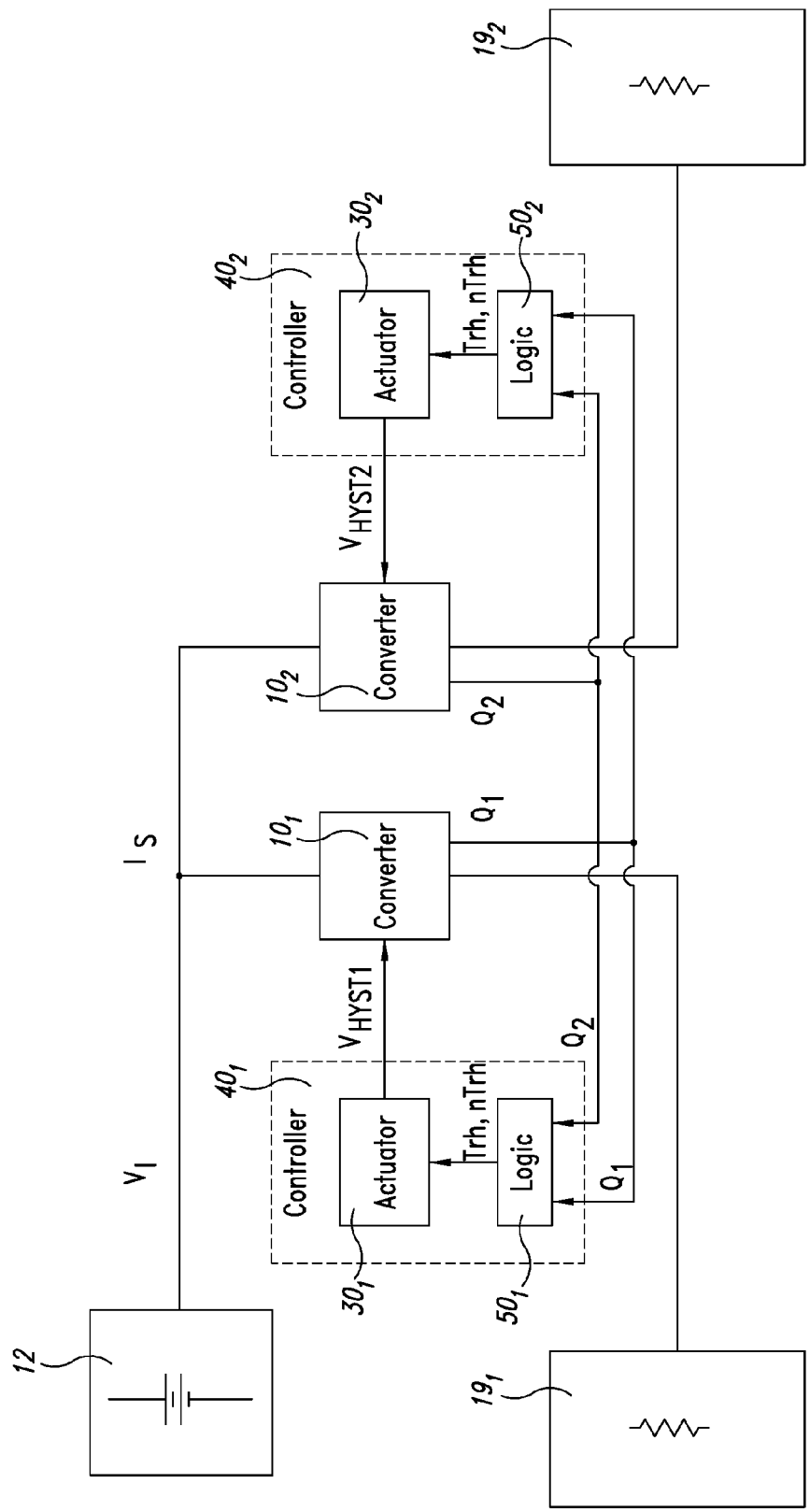
FIGS. 5A and 5B represent a DC-DC buck converter apparatus implementing the method here described, respectively in a multiple output voltage configuration and in a multi-phase single output converter configuration.
Figure 5B:
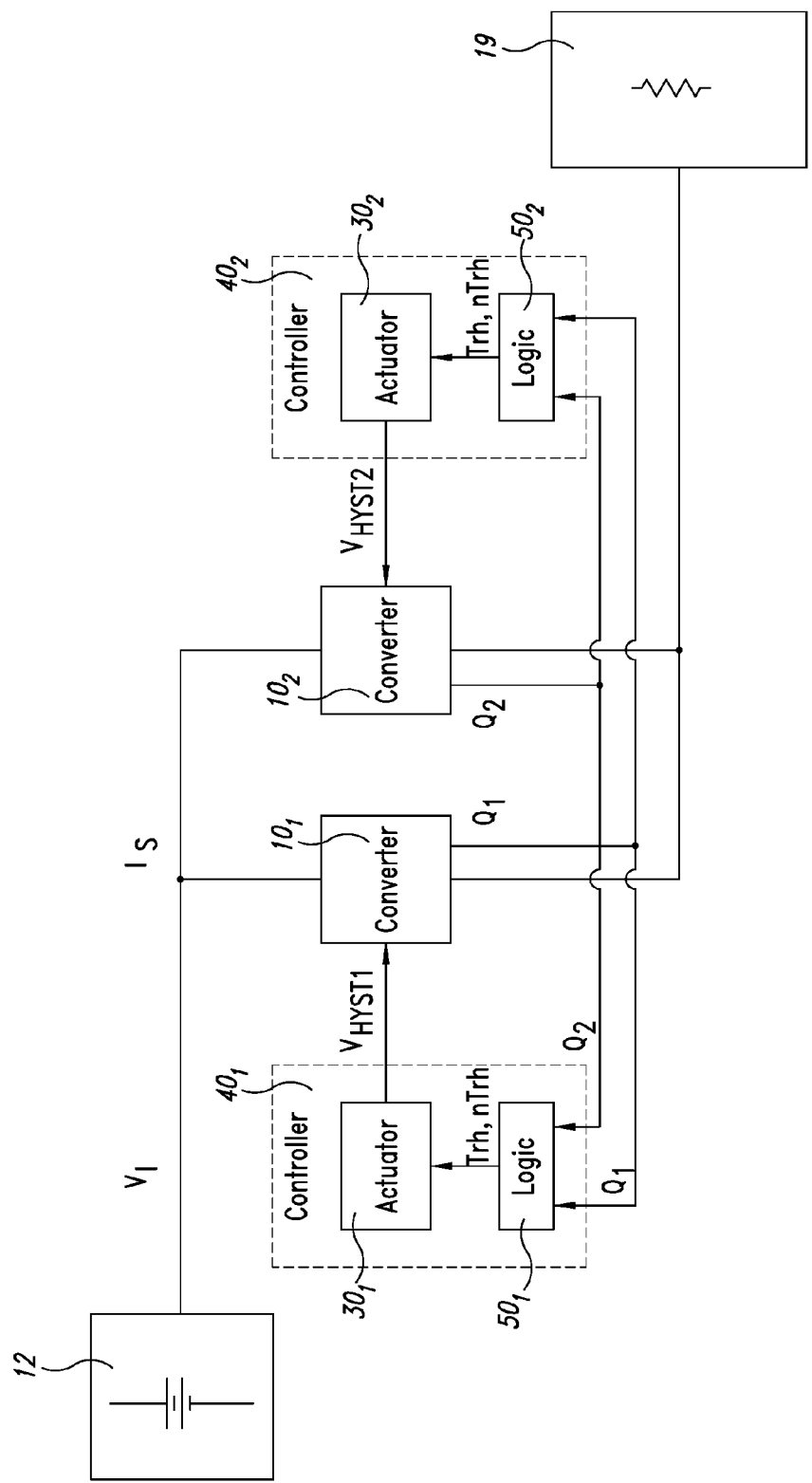

In FIGS. 5A and 5B are shown schematically two converters like the converter 10 of FIG. 1, respectively a first converter $10_1$ and a second converter $10_2$, connected to a same battery 12 which generates an input voltage Vi, brought in parallel as input to both converters. At the same time the two converters $10_1$ and $10_2$ can output two different points of load (FIG. 5A), which are represented by resistances $19_1$ and $19_2$, or jointly output a load current $I_s$ in a load represented by resistor 19 (FIG. 5B). The two converters $10_1$ and $10_2$ are placed on a same semiconductor die or chip. Each converter $10_1$ and $10_2$ is associated with a respective control module $40_1$ and $40_2$ that will be better detailed in the following, in particular with reference to FIGS. 9 and 10.

Figure 3:
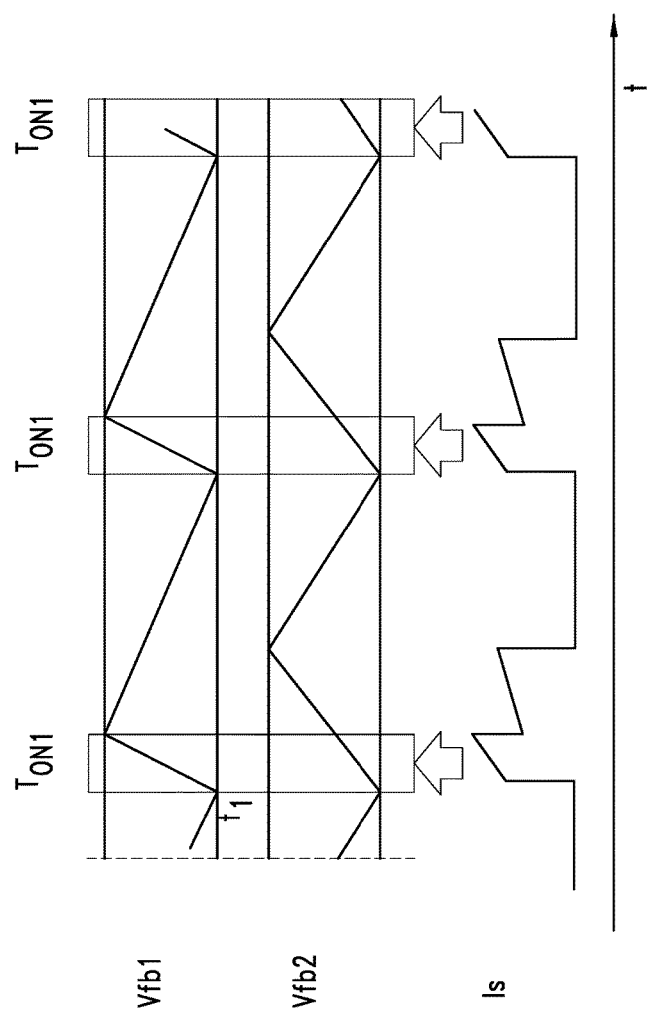

The basic idea is described with reference also to the time diagrams of FIG. 6 and FIG. 7, which, like the time diagram in FIG. 3, with $V_{fb1}$ indicates the triangular feedback voltage of the first converter $10_1$, entering the positive input of the respective hysteretic comparator, while with $V_{fb2}$ is indicated the feedback voltage of the second converter $10_2$. The supply current $I_s$ is not shown in FIGS. 6 and 7.

The described solution envisages to work on the converter hysteresis to increase the noise immunity of the converters. Considering the case of two converters $10_1$ and $10_2$ being present on the same chip, the solution shown in FIG. 5A or 5B increases the hysteresis window (applies an increase $\Delta V_{HYST}$ to the amplitude $V_{HYST}$ of the hysteresis window) of one of the two converters (more in general each of a plurality of converters, as better detailed in the following), when the other converter triggers a switch-on event. That is, the converter $10_1$ increases its hysteresis window in response to the converter $10_2$ triggering a switch-on event and the converter $10_2$ increases its hysteresis window in response to the converter $10_1$ triggering a switch-on event. With more than two converters, each converter increases its hysteresis window in response to any of the other converters triggering a switch-on event. In this way, the probability to have two synchronized switch-on events is reduced. With reference to the diagram of FIG. 6, the switch-on event of the first converter $10_1$ occurs when the feedback voltages Vfb1 reaches the beginning instant, indicated by $t_1$, of the switch-on period TONI and the switch-on event of the second converter $10_2$ is triggered when the feedback voltages Vfb2 reaches the beginning instant, indicated by $t_2$, of the switch-on period $T_{ON2}$.

After the expiration of the switch-on period $T_{ON1}$ of the first converter $10_1$ (i.e., during $T_{OFF1}$), if the second converter $10_2$ is not switched on, i.e., does not reach the beginning instant, indicated b $t_2$ of the respective switch-on period $T_{ON2}$, the hysteresis amplitude $V_{HYST2}$ of the second converter $10_2$ is restored to the normal value, i.e., is reduced by removing the increase $\Delta V_{Hyst2}$, reverting to normal operation. The condition described in FIG. 6 corresponds to dis-overlapped, or non-overlapped, feedback signals. As shown in FIG. 6, the increase $\Delta V_{HYST2}$ is applied by lowering the lower hysteresis threshold $V_{THL}$, i.e., to the threshold, that, when it is reached by the decreasing feedback voltage, triggers the switch-on period $T_{ON}$. Also, the increase $\Delta V_{HYST2}$ is referred to the amplitude $V_{HYST2}$ of the hysteresis window, while in the case of the lower hysteresis threshold $V_{THL}$ the increase $\Delta V_{HYST2}$ corresponds to a decrease of the same amount of the absolute value of such threshold (if it is a positive value).

Figure 6:
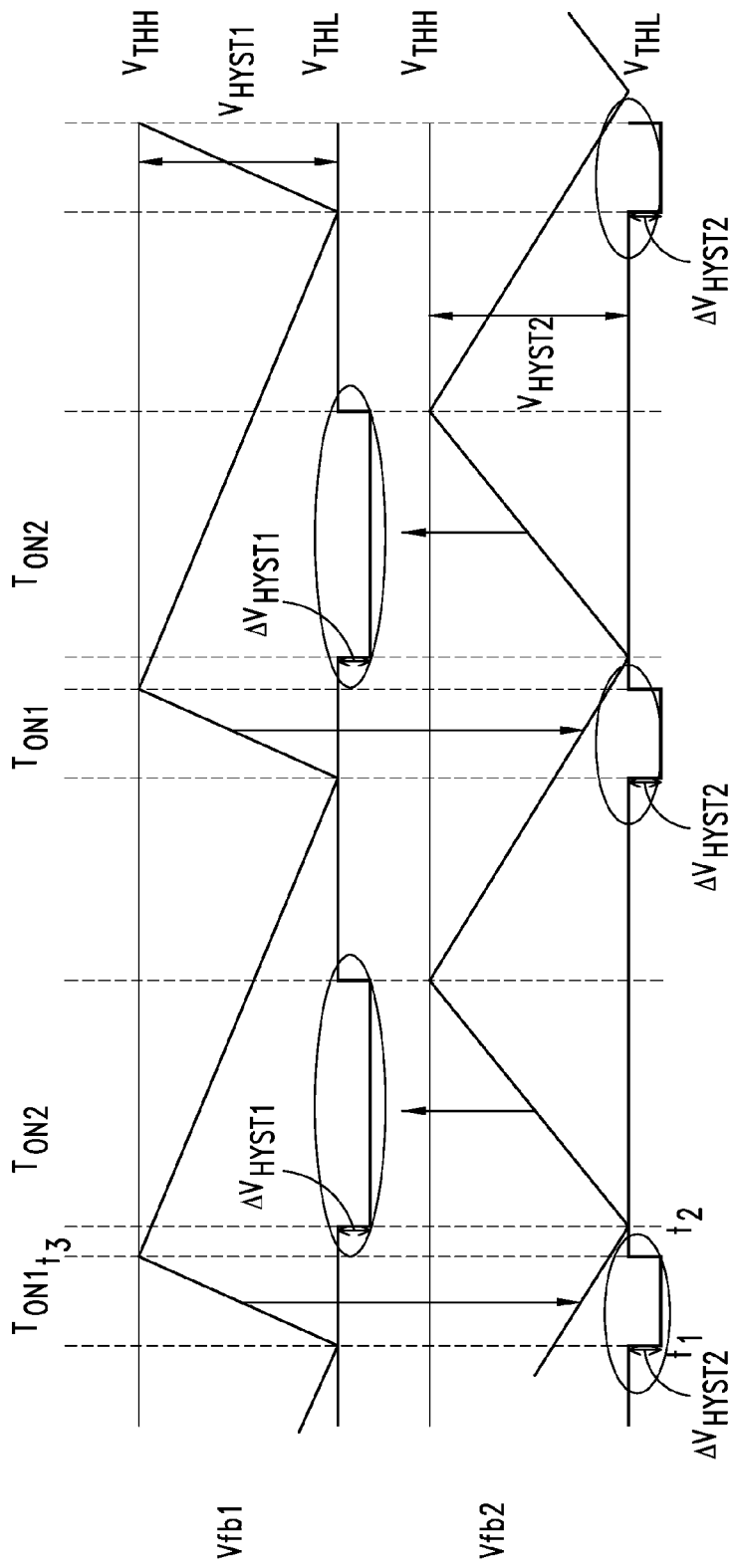
FIG. 6 represents a time diagram illustrating signals of the apparatus of FIG. 5 operating according to the method here described.
Figure 7:
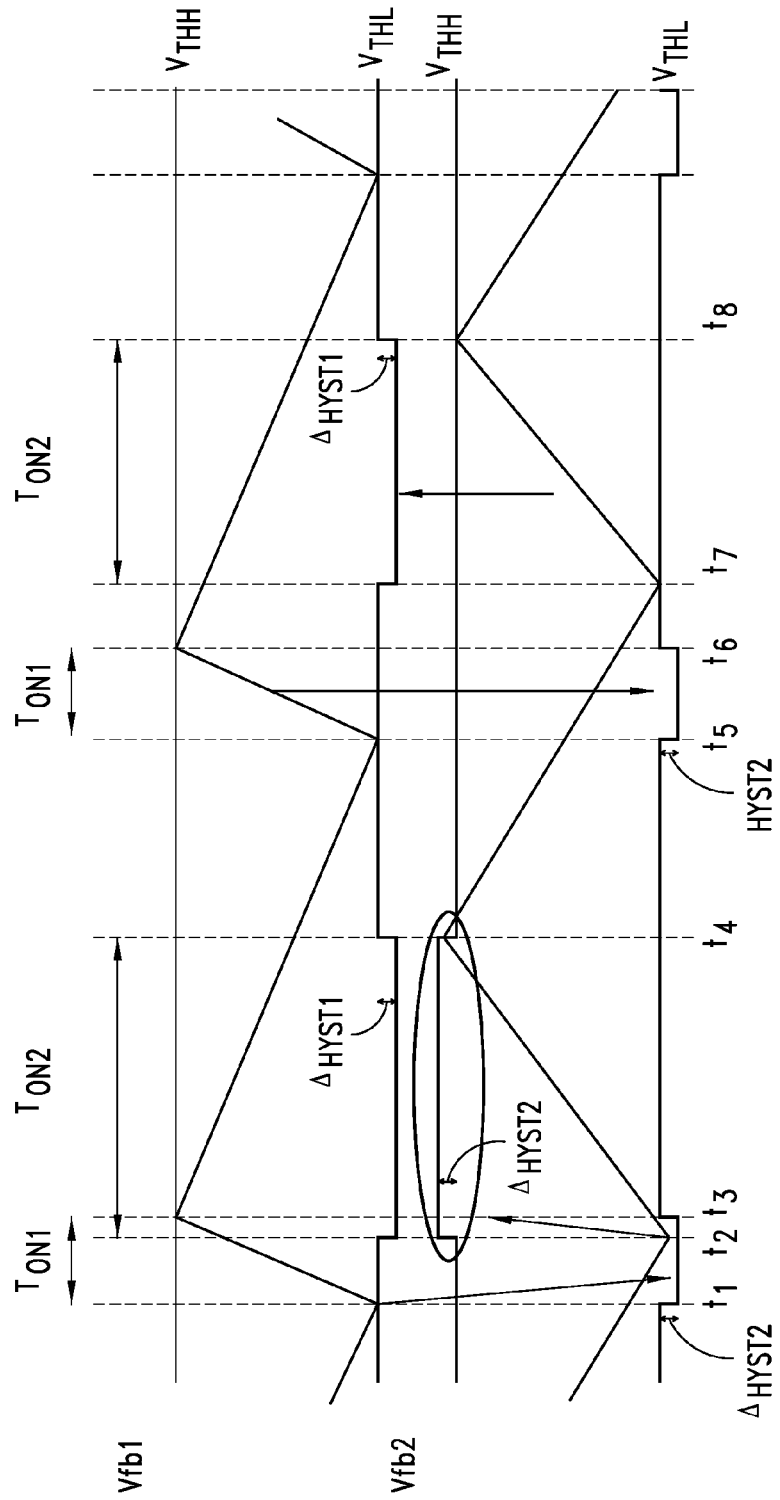
FIG. 7 represents a time diagram illustrating further signals of the apparatus of FIG. 5A, 5B operating according to the method here described.

FIG. 7 is a time diagram corresponding to the time diagram of FIG. 6, which however represents a different operating condition, which is a condition with partially overlapped feedback signals. In other words, FIG. 7 represents the case in which the second converter $10_2$ is switched on (at time t2) during the switch-on period $T_{ON1}$ of the first converter $10_1$. In this case, the hysteresis amplitude $V_{HYST2}$ of the second regulator $10_2$ is latched to the value with the increase $\Delta V_{HYST2}$, i.e., the increased hysteresis amplitude is maintained through the switch-on time $T_{ON2}$ of the second converter $10_2$. In other words, the high hysteresis threshold is increased by $\Delta V_{HYST}$ and this makes both the switch-on period $T_{ON}$ and switch-off period $T_{OFF}$ increase, because the switch-on period $T_{ON}$ is ended until the corresponding feedback voltage node (Vfb1, Vfb2) has reached a higher voltage on the rising edge of the triangular wave and the switch-off period $T_{OFF}$ starts from a higher voltage during this falling edge. The result is that both the switch-on period $T_{ON2}$ and the consecutive switch-off period $T_{OFF2}$ (beginning at instant $t_4$ in FIG. 7) are driven with such hysteresis value. As shown in FIG. 7, in practice when the switch-on period $T_{ON2}$ begins, the increase $\Delta V_{HYST2}$ is applied to the upper threshold $V_{THH}$ of the hysteresis window, while the decrease $\Delta V_{HYST2}$ on the lower threshold $V_{THL}$ is removed at the end of the first switch-on period $T_{ON1}$ and time $t_3$, maintaining the same increased value of the hysteresis amplitude $V_{HYST2}$ for the transition to the switch-off period, in particular when the second feedback voltage $V_{fb2}$ approaches the upper bound of the hysteresis window. Thus, in the condition shown in FIG. 7, a first threshold (e.g., the lower threshold $V_{THL}$) of the second converter $10_2$ is first lowered at the switch-on of the first converter $10_1$, and then varying the other hysteresis threshold (e.g., the high hysteresis threshold $V_{THH}$) to maintain constant the inductor average current and the average output voltage.

Supposing that the frequency of the two converters $10_1$ and $10_2$ are very close, in this way the period of the second converter $10_2$ is slightly increased. This increased period makes the switch-on period $T_{ON2}$ of the second converter $10_2$ shift with respect to switch-on period $T_{ON1}$ of the first converter $10_1$. As shown in FIG. 7, the second cycle of switching, beginning at time $t_5$ at which a new switch on period $T_{ON1}$ is reached for the first converter $10_1$, due to above increase of the period of the second converter, corresponds already to a dis-overlapped, or non-overlapped condition like in FIG. 6, i.e., the switch on period $T_{ON2}$ is reached at a time $t_7$ when the switch on period $T_{ON1}$ has already expired (at time $t_6$). Therefore, as in the non-overlapped condition described in FIG. 6, the increase is just applied to the lower threshold $V_{THL}$ of the second converter $10_2$, and then the amplitude $V_{HYST2}$ of the hysteresis window of this converter is restored as soon as the switch-on period of the first converter is over (at time $t_6$). Symmetrically, the lower threshold $V_{THL}$ of the first converter $10_1$, and then the amplitude $V_{HYST1}$ of the hysteresis window of this converter is first increased at time $t_7$ when the second converter switches on, and the restored as soon as the switch-on period of the second converter $10_2$ is over (at time $t_8$).

Figure 4:
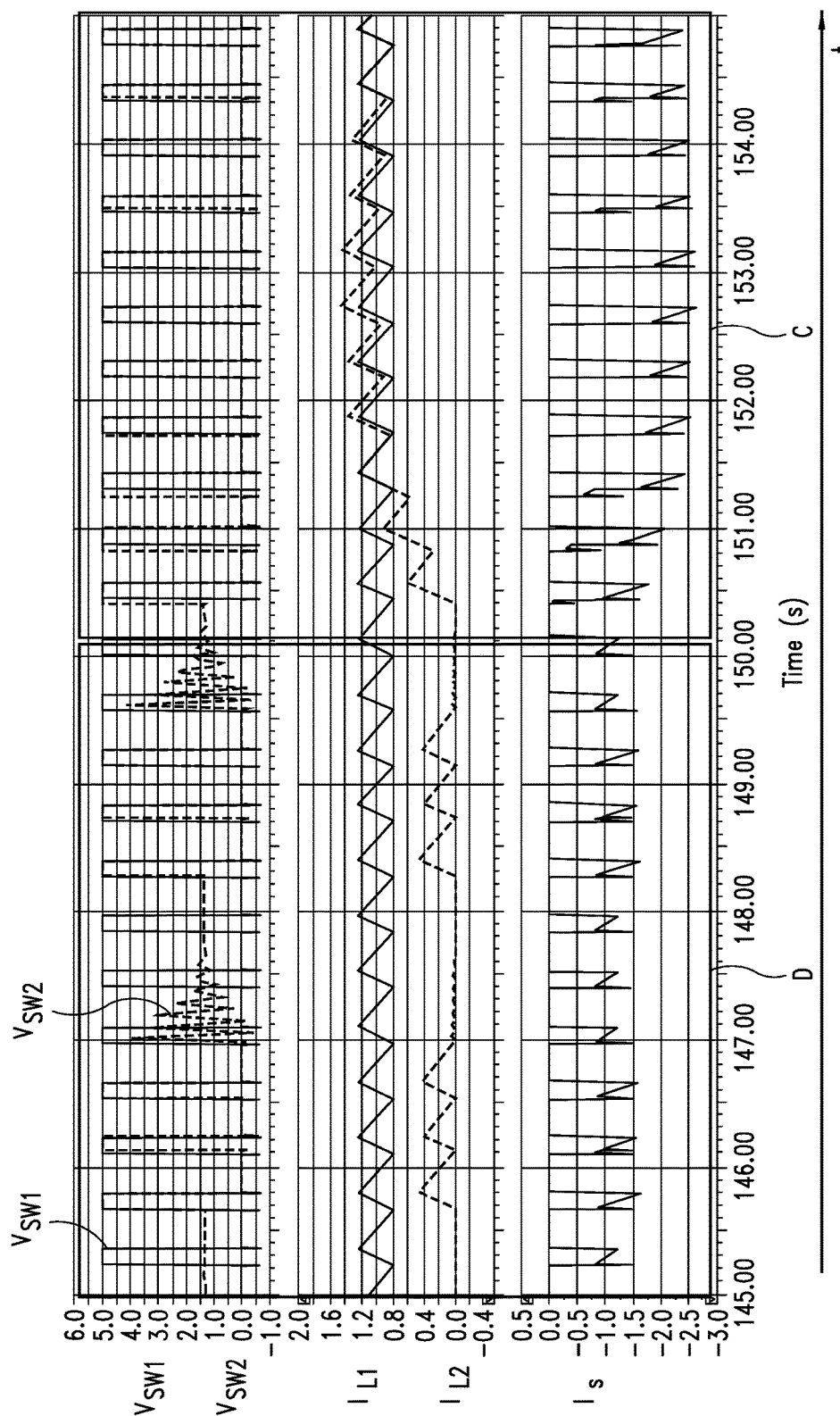
Figure 8:
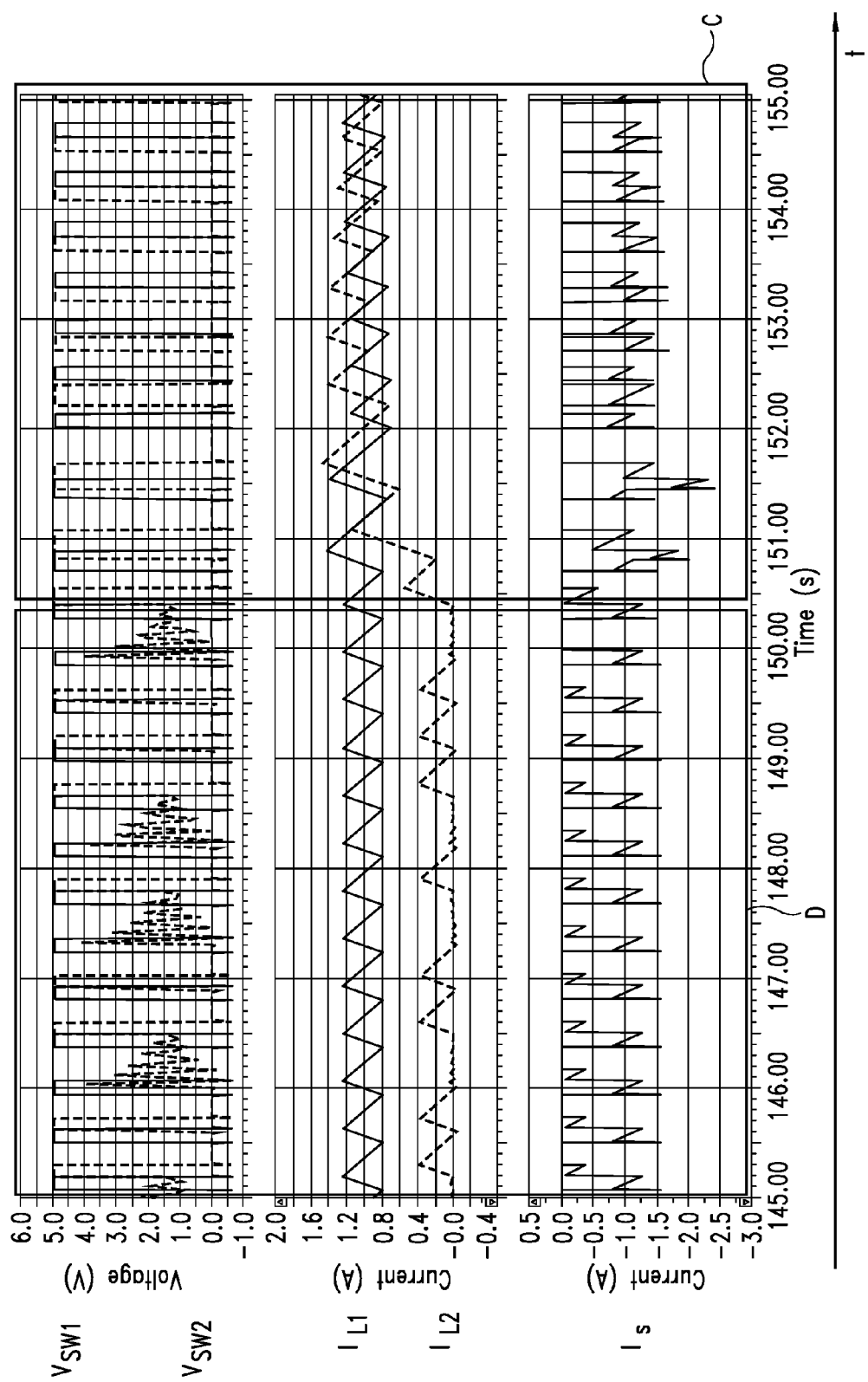
FIG. 8 represents a time diagram illustrating the signals of FIG. 6 according to the method here described in a different operating condition.

In FIG. 8, like in the previous FIG. 4, are shown the simulation of voltages at the switching node SW for each converter respectively, $V_{SW1}$ and $V_{SW2}$, the currents $I_{L1}$ and $I_{L2}$ through the respective inductors (like inductor 13 in FIG. 1), and the total supply current $I_s$, for the arrangement of FIGS. 5A and 5B. Also in this case the time window is divided in two sub-windows, a first sub-window D, representing operation under DCM (Discontinuous Conduction Mode), and a second sub-window C, representing operation under CCM (Continuous Current Mode).

In FIG. 8 the two converters $10_1$ and $10_2$, previously synchronized, are now interleaved, both in CCM both in DCM mode: the switching on of the first regulator $10_1$ no more affects the behavior of the second regulator $10_2$, that now is free to operate at its proper frequency; only just after a load step the two switch-on periods $T_{ON1}$ and $T_{ON2}$ are superimposed for few microseconds to quickly recover the voltage drop at the output of the second regulator $10_2$, but after few cycles they tend to separate from each other.

FIG. 8 shows also a reduced peak supply current, as the RMS one, then an improved EMI with respect to the simulation of FIG. 4.

With respect to solutions like the one adding a clock, the solution just described has the advantage that both the converters, or regulators, are working as proper hysteretic DC-DC converters and for this reason the transient current load response is very fast. At the same time, the hysteresis increasing method allows to distribute the regulator switch-on period along the total switching period.

It is possible to apply the procedure just described with reference to FIGS. 5, 6 and 7 to more than two hysteretic DC-DC converters, adding an additional hysteresis voltage increase for every regulator that switches on in an over-lapped fashion. In this way, all the converters are automatically dis-overlapping or distributing along the period to minimize the supply current peak and its RMS.

Figure 11:
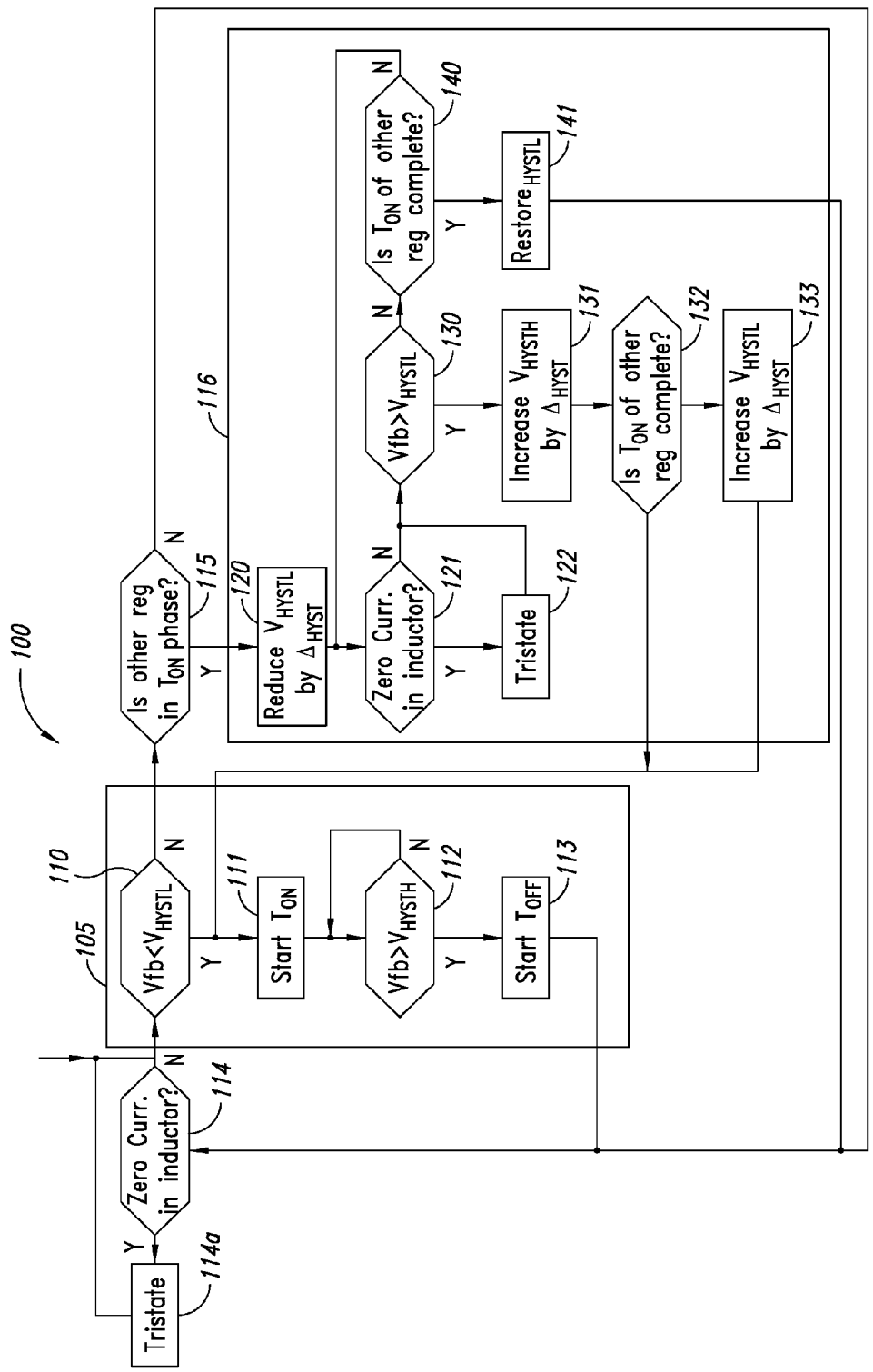
FIG. 11 represents a flow diagram showing the operation of the method here described in a DC buck converter apparatus with two converters.

In FIG. 11 is represented a flow diagram showing an embodiment of the operation of the method here described in a DC buck converter apparatus with two converters, indicated as a whole with the reference 100. The method 100 is preferably implemented by respective control logic circuits, such as the control modules $40_1$, $40_2$, which are respectively associated with the converters $10_1$, $10_2$. Each control logic circuit receives or measures the signals or voltages of its own converter and of the other converters which are relevant to the operation of the method, as already described above and detailed hereinbelow. Other operations (as procedure 105) can be inherently implemented by the converter architecture.

Therefore, according to such method, the converter operates a switch-on procedure 105, which includes a first step 110 that verifies if the feedback voltage of a given converter, for instance, with reference to FIG. 7, the second feedback voltage $V_{fb2}$ of the second converter $10_2$, is lower that the lower threshold $V_{THL}$.

In the affirmative, in a step 111 the converter enters the switch-on period $T_{ON}$.

In a step 112 the method verifies that the feedback voltage $V_{fb}$ is lower or equal than the higher threshold $V_{THH}$. When the feedback voltage $V_{fb}$ reaches the higher threshold $V_{THH}$, in a step 113 the converter enters the switch-off period $T_{OFF}$.

The switch-on procedure 105 is in general managed by the converter itself, since the steps 110, 111 are implemented by the comparator 11 and the driver 20 of each converter $10_1$, $10_2$, which generate the PWM signal Q. However the control logic can for instance sample the output of the comparator 11 to implement the verification step 110 and trigger (in case of negative answer) the other operations 115, 116 described in the following.

Subsequently, after the step 113, i.e., the beginning of the switch-off period $T_{OFF}$, the control passes to a step 114 in which it is verified if the current flowing in the inductor 13 of such converter is zero, i.e., the converter is not in the on or off state. In the affirmative the converter goes in a tri-state state 114$a$, then control passes at the start of the procedure 100. In the negative control passes again to step 110.

If the step 110 gives a negative output, i.e., the feedback voltage $V_{fb}$ reaches the lower threshold $V_{THL}$, in a step 115 it is evaluated if the switch-on period of another converter is detected. In this example, with two converters, always with reference to FIGS. 6 and 7, the second logic circuit $50_2$ evaluates the switch-on period of the first converter $10_1$ and the first logic circuit $50_1$ evaluates the switch-on period of the second converter $10_2$.

If the step 110 gives a positive output (e.g., corresponding to time $t_1$ in FIG. 7), the method enters a procedure 116 of regulation of the hysteresis amplitude.

Such procedure of regulation of the hysteresis amplitude includes a step 120 of reducing the lower threshold $V_{THL}$ of the given, e.g., second converter, by a quantity $\Delta V_{HYST2}$, thus increasing the hysteresis amplitude $V_{HYST2}$.

Subsequently, the control passes to a step 121 in which it is verified if the current flowing in the inductor 13 of the converter is zero. In the affirmative the logic goes in a tri-state state 122, then control passes to a step 130 of verification if the feedback voltage of the given converter, now reaches the lower threshold $V_{THL}$. In the negative control passes directly to such step 130.

If the result of the verification step 130 is positive, i.e., the feedback voltage reaches the lower threshold $V_{THL}$, then in a step 131 the higher threshold $V_{THH}$ is increased. Then in a step 132 it is verified if the switch-on period of the other converter is complete. In the affirmative, in a step 133 the lower threshold $V_{THL}$ is restored (like at time $t_2$ in FIG. 7). Control passes to step 111 in which the given converter enters the switch-on period. Control passes directly to step 111 if the verification step 132 is negative.

If the result of the verification step 130 is negative, e.g., the second feedback voltage $V_{fb2}$ does not reach the lower threshold $V_{THL}$, then it is verified in a step 140 if the other switch-on period, e.g., $T_{ON1}$, is complete. In the negative, control is brought back to step 121. In the positive in a step 145 the lower threshold $V_{THL}$ is restored (e.g., $t_6$ in FIG. 7). Then, control passes to step 111 in which the other converter enters the switch-on period, e.g., $T_{ON2}$.

Figure 12A:
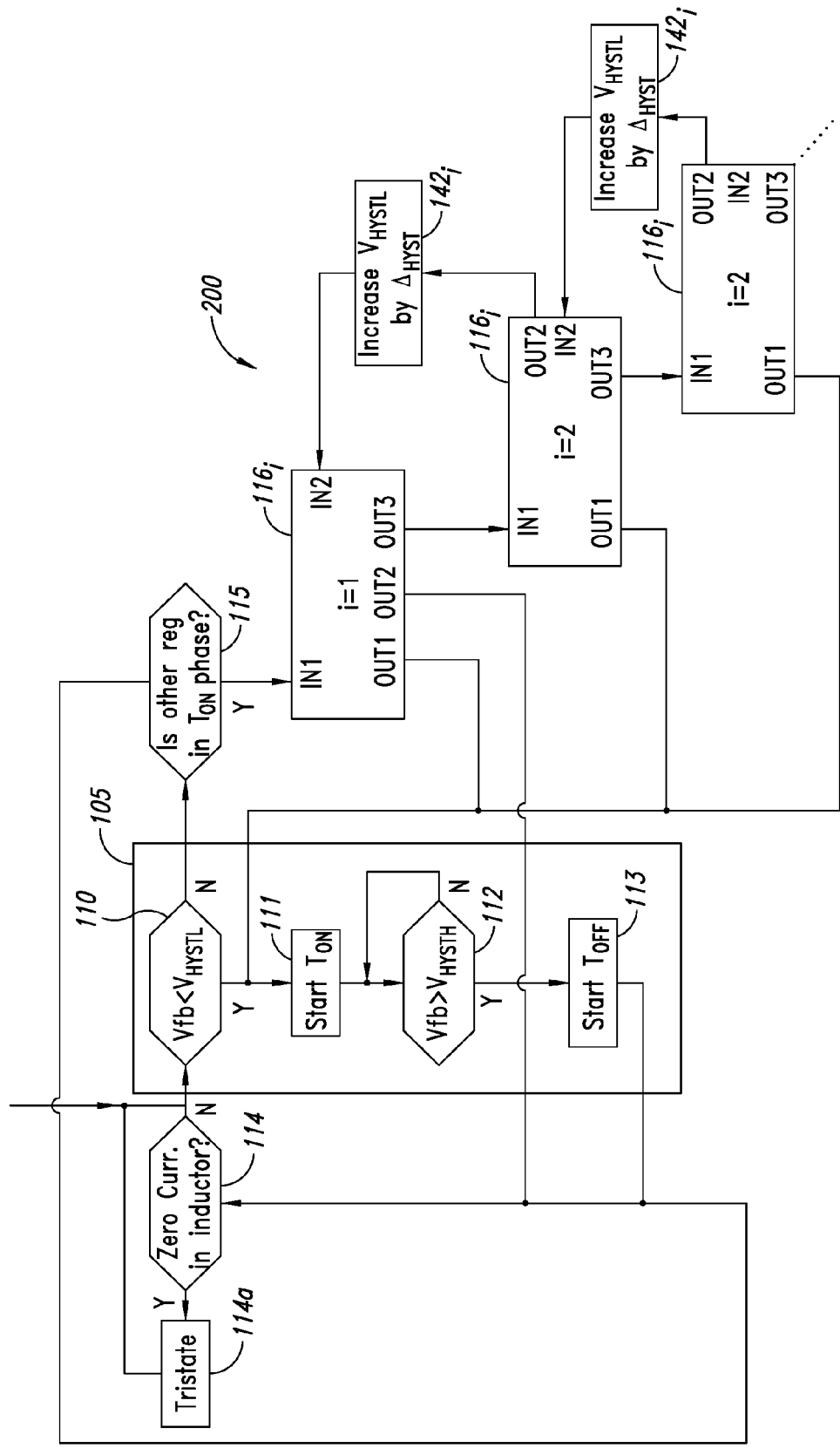
FIGS. 12A and 12B represent a flow diagram showing the operation of the method here described in a DC buck converter apparatus with multiple converters.
Figure 12B:
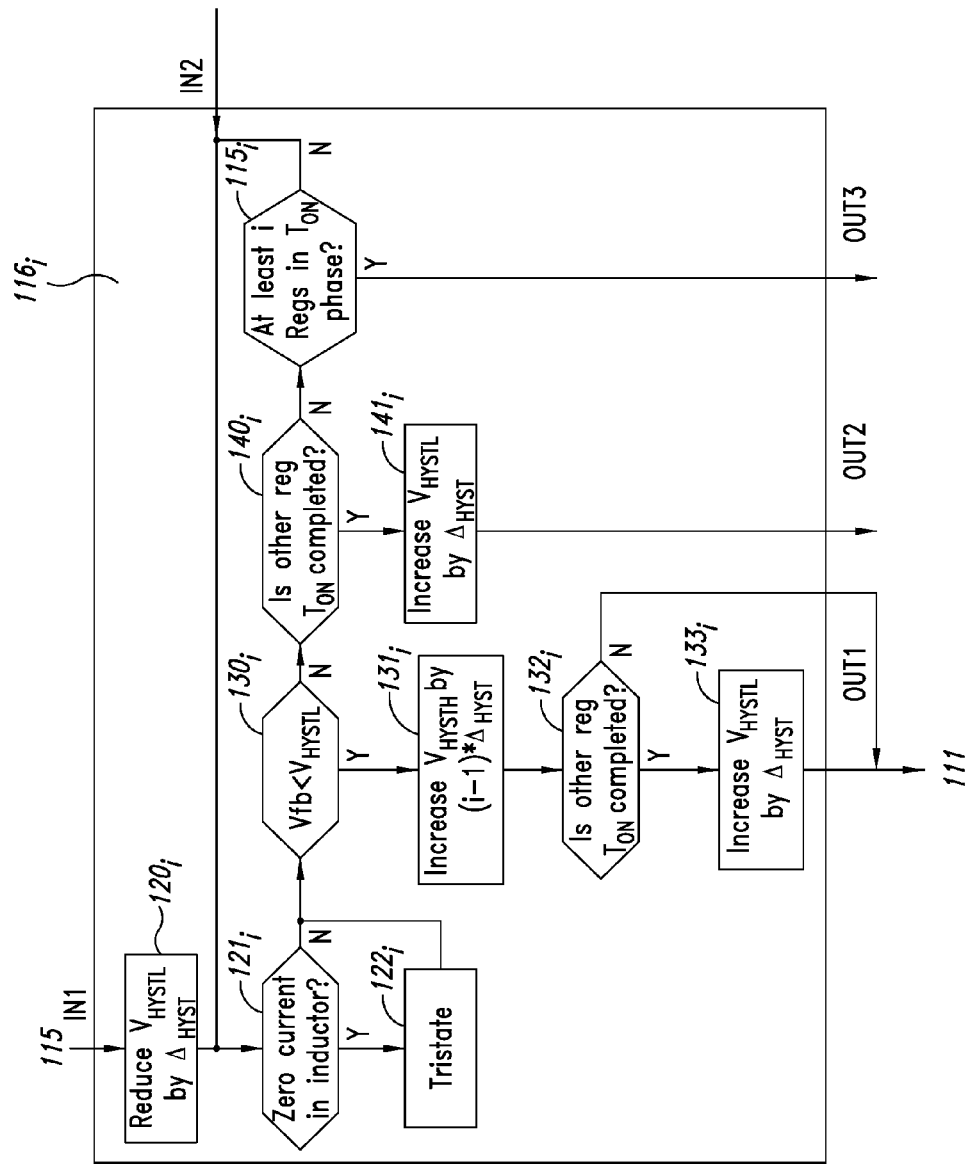

FIG. 11 describes the operations when only two converters are involved. In FIGS. 12A-12B it is shown a flow diagram which shows the behavior when there are more than two converters.

In FIG. 11 if verification step 115 is positive, the procedure 116 of regulation of the hysteresis voltage is accessed, which involves steps 120, 131-133, 140, 141, 121 and 122.

In case of more than two regulators, in FIGS. 12A-12B it is shown an embodiment 200 of the method here described where it is adopted a representation according to which index i represents the number of other converters (different from the converter implementing the procedure 200) in the plurality of converters which is detected as switched on plus one. Thus, index i starts from value 2 (case of FIG. 11) and increases with each instance of block $116_i$ issued when a further converter is switched on (as indicated below). FIG. 12A shows a case in which there are at a certain time instant at least three converters switched on, although, due to the iterative nature of procedure 200, such procedure can be expanded easily to greater values of number of converters detected switched on.

Thus, as shown in FIG. 12A, there are a plurality of iterations of the procedure 116 of regulation of the hysteresis voltage, indicated with $116_i$, where i is respectively 1, 2 and 3, etc., each being activated when a further converter in the plurality enters its switch-on period.

The procedure 105 and steps 114, 114a are the same as method 100 of FIG. 11 as they refer to normal operation of a given converter, for instance the second converter, or a generic converter in the plurality of converters. Also step 115 is substantially analogous to the one of FIG. 11 and verifies if at least one converter in the plurality of converters of the apparatus is in its switch-on period. With two converters it is the same step 115 of FIG. 11.

If at least one converter in the plurality of converters of the apparatus is in its switch-on period, the procedure 200 enters (through an input node IN1) a block $116_i$, with i=1, of regulation of the hysteresis voltage. This block, which is detailed in FIG. 12B, is analogous to block 116 in FIG. 11, and steps $120_i$, $121_i$, $130_i$ correspond to step 120, 121, 130 of method 100 of FIG. 11. Step $131_i$ however differs from step 131 in that the higher threshold $V_{THH}$ is increased by i times the increased voltage $\Delta V_{HYST}$. This means that again, if there is only another one converter switched on, i=1 and step $131_i$ and 131 coincide. If, other converters are on, in the corresponding other block $116_i$ where i is 2 and 3 respectively, the increased voltage $\Delta V_{HYST}$ is multiplied by 2 or 3 accordingly.

Steps $132_i$ and $133_i$ correspond to step 132, 133 of FIG. 11 and lead to output OUT1 toward step 111.

Then, step $140_i$ corresponds to step 140, i.e., it is verified in a step 140 if the other switch-on period detected at step 115 is complete. In the affirmative, however a step $141_i$ provides increasing the lower threshold $V_{THL}$ by a voltage increase $\Delta V_{HYST}$. In the case with two converters this corresponds to restore the lower threshold $V_{THL}$. In this case the procedure $116_i$ is exited through output node OUT2 after step $145_i$ and control passes back to step 111. In the case of more than two converters switched on (i=3), however, since it is not sufficient to apply a voltage increase $\Delta V_{HYST}$ to restore the lower threshold, from output OUT2 control is passed to a block $142_i$, which replicates block $141_i$ and provides increasing the lower threshold $V_{THL}$ by a further voltage increase $\Delta V_{HYST}$. Then control passes to the previous block $116_i$ (through input IN2).

Then the block $116_i$ differs from block 116 in that if it is verified in step $140_i$ that the other switch-on period detected at step 115' is not complete, control passes in this case to a step $115_i$, which verifies if there are at least i converters in the switch-on period.

In the negative control is brought back to step $121_i$.

In the affirmative, i.e., there is another converter in the switch-on period, the procedure $116_i$ is exited through output node OUT3 after step $115_i$ to enter through input IN1 in an analogous block $116_i$, where index i is incremented by one.

In FIG. 12A as mentioned are shown three blocks $116_i$, each corresponding to a further converter switched on (i=1, 2, 3). The output OUT3 of step $115_i$, for each block $116_i$ controls the input IN1 of the following block $116_i$ with increased index. Each output OUT1 of the step 131-133 is brought back to step 111, while output OUT2 from step $141_i$ of restore/increase the lower threshold only for i=2 is brought back to input of step 114, while in the following blocks 116 OUT2 is connected to step $142_i$.

On the basis of the specific embodiments of the flow diagrams of FIGS. 11, 12A and 12B therefore substantially the method for managing a plurality of hysteretic DC-DC buck converters here described comprises the operations of: while the operation 105 of verifying if a respective feedback voltage $V_{fb2}$ reaches a lower threshold $V_{THL}$ indicates that the lower threshold $V_{THL}$ is not reached, detecting in a step 115 or $115_i$ if at least another converter, e.g., $10_1$, in said plurality of converters has entered a respective switch on period $T_{ON1}$ and, in the affirmative, entering a hysteresis voltage adjustment procedure 116 or $116_i$, comprising a step 120 or $120_i$ of increasing by a given amount $\Delta V_{HYST}$ the amplitude of the hysteresis window $V_{HYST2}$ of at least the given converter, e.g., $10_2$, by reducing the lower threshold $V_{THL}$ of the hysteresis window $V_{HYST2}$.

According to a further aspect, the hysteresis voltage adjustment procedure 116 or $116_i$ includes, after said step 120 or 120i of increasing by a given amount $\Delta V_{HYST}$ the amplitude of the hysteresis window $V_{HYST2}$, verifying in a step 130 if the feedback voltage of the given converter $10_2$ now reaches the lower threshold $V_{THL}$, and in the affirmative increasing 131 a higher threshold $V_{THH}$ of the hysteresis window $V_{HYST2}$.

According to a further aspect, the method includes subsequently verifying in a step 132 or $132_i$ if the switch-on period, e.g., $T_{ON1}$, of the other converter is complete and, in the affirmative, restoring 133 the lower threshold $V_{THL}$.

According to a further aspect, said step 130 of verifying if the feedback voltage of the given converter $10_2$ now reaches the lower threshold $V_{THL}$ gives a negative result, includes subsequently verifying in a step 140 or 140i if the switch-on period $T_{ON1}$ of the other converter is complete and, in the affirmative, restoring in a step 133 the lower threshold $V_{THL}$.

According to a further aspect, the hysteresis voltage adjustment procedure 116 or $116_i$ includes detecting $115i$ if a further converter different from said other converter has entered a respective switch-on period $T_{ON}$ and, in the affirmative, performing a further instance of the hysteresis voltage adjustment procedure $116_i$.

According to a further aspect, in each further instance of the hysteresis voltage adjustment procedure $116_i$ the step of increasing $131_i$ a higher threshold $V_{THH}$ of the hysteresis window $V_{HYST2}$ is performed by adding a further given voltage amount $\Delta V_{HYST}$ to a given voltage given amount $\Delta V_{HYST}$ added in the first instance 116.

In the following it is described a circuital solution that can implement the management of the feedback voltages described with reference to FIGS. 6 and 7.

Figure 9:
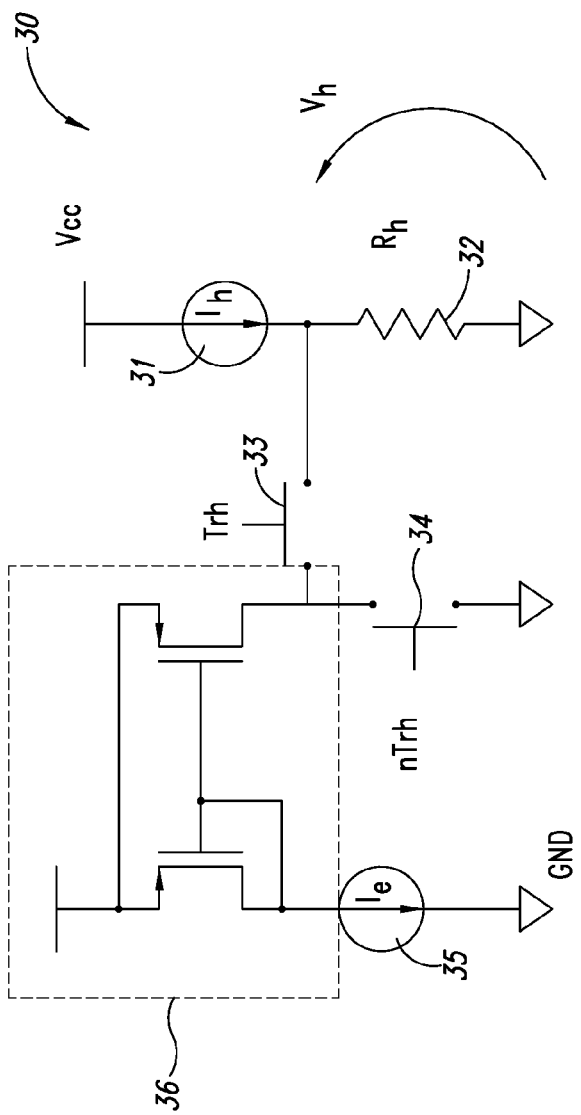
FIG. 9 represents schematically an implementation of a detail of the circuit of FIG. 5A or FIG. 5B.

In a hysteretic DC-DC converter, the hysteresis window could be obtained injecting, for instance, a current on resistor. Thus FIG. 9 shows a hysteresis varying circuit solution, indicated with the reference 30, where a voltage $V_h$, which correspond by way of example to the voltage amplitude $V_{HYST}$ of the hysteresis window of comparator 11, is increased by increasing a current $I_h$ flowing in a resistor 32, having resistance value $R_h$, to lower the possibility to have simultaneous turning on of the converters, acting on two switches managed by a synchronizing logic 50, shown in FIG. 10. The circuit of FIG. 9 has a current generator 31, connected between the supply voltage Vcc and the input node of resistor 32, which is connected to ground GND at the other end, the current generator 31 flowing a current $I_h$ into resistor 32. Hysteresis voltage $V_h$ forms across resistor 32 in dependence of the value of the current which enters the input node of resistor 32. A first switch 33 is placed between the output node of a current mirror 36, which mirrors an extra current $I_e$ of an extra current generator 35, and the input node of the resistor 32 to which also the current generator 31 is connected. A second switch 34 is placed between the output node of the current mirror 36 and ground GND. The switch 33 is driven by an increase hysteresis signal Trh which allows to inject the extra current $I_e$ through the current mirror 36, thus increasing the amplitude of the hysteresis voltage $V_h$, while the switch 34 is driven by a negated increase hysteresis signal nTrh, so that the switch 34 diverts the extra current $I_e$ to ground GND, instead of turning off the circuit, in order to be able to work at higher frequencies. It is underlined that the circuit produces a positive hysteresis voltage $V_h$ to be supplied to comparator 11 as hysteresis parameter regulating its hysteresis. However, the circuit 30 can be used dually to provide a hysteresis decrease to the comparator 11 by taking the inverse voltage drop on resistor 32.

The synchronizing logic 50, which is in this case the logic associated with the first converter $10_1$, receives as input the PWM signals $Q_1$, $Q_2$ of the first and second converters and it is configured to detect the time of reaching, $t_1$ in FIG. 6, of the switch on period $T_{ON1}$ from said PWM signals $Q_1$, $Q_2$ and issue activation signals Trh and nTrh of the actuation circuit, i.e., the hysteresis varying circuit 30, which increase or decrease respectively the hysteresis amplitude $V_{HYST}$.

In particular such logic circuit 50 receives at a first one-shot short delay logic gate 51 and second one-shot short delay logic gate 52 respectively a PWM signal, $Q_2$, of the second converter $10_2$, and its negated signal. These one-shot short delay gates 51 produce a short pulse on the rising edge of the switch-on period $T_{ON2}$. This means that the hysteresis of the first DC-DC converter, $10_1$ in this case is managed by a PWM event of the other one, e.g., $10_2$; one of these synchronizing logic circuit 50 having to be included for each regulator.

Then the output of the first one shot gate 51 and a PWM signal of the first converter, $Q_1$, are brought as inputs to an AND gate 54. The output of such AND gate 54 and the output of the second one-shot short delay logic gate 52 trigger respectively the set S and reset R inputs of a set reset flip flop 55, which output is brought together with the PWM signal of the first converter, $Q_1$, as inputs to a second NOR gate 56, generating the negated increase hysteresis signal nTrh, while the increase hysteresis signal Trh is obtained by applying a further inverter gate 57 to the negated increase hysteresis signal nTrh.

As it will be clear for the person skilled in the art, the short delay logic gate 51, 52 is substantially a mono-stable circuit which produces a short pulse on the rising edge of the switch-on period, the length of the pulse being very short with respect to the length of the switch-on period, but sufficient to operate the set and reset of the set reset flip flop 55.

Figure 10:
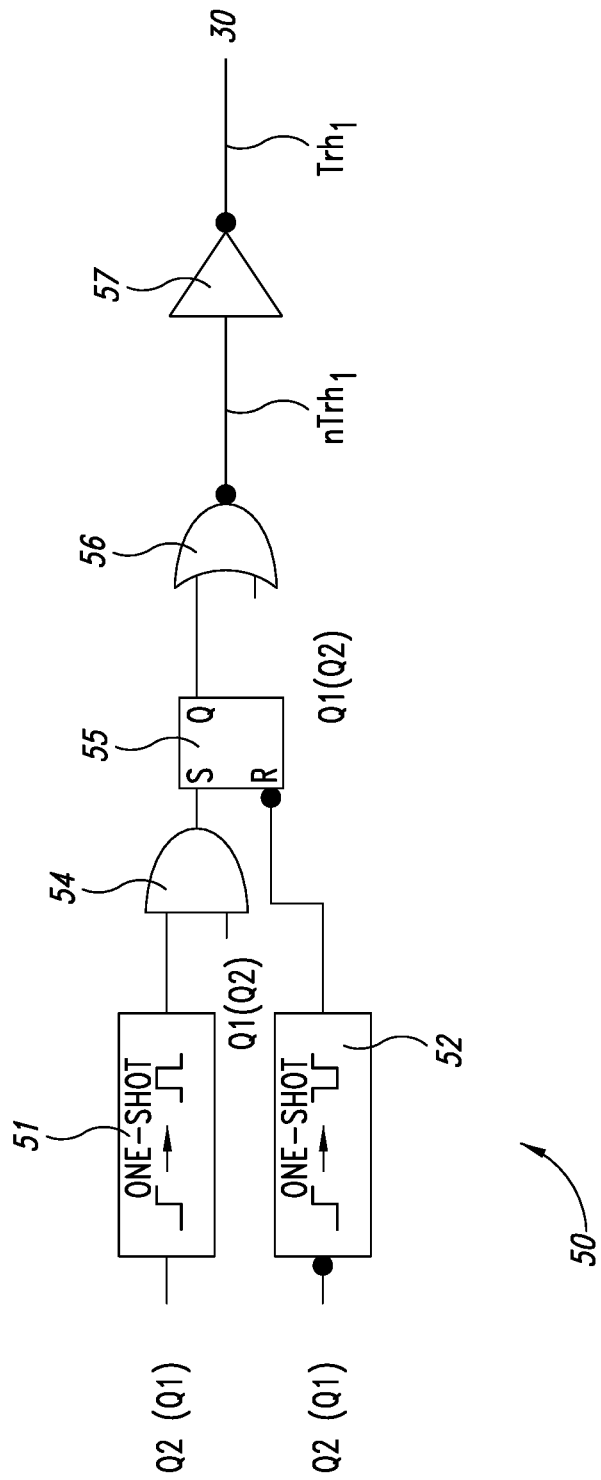
FIG. 10 represents schematically a possible logic circuit to drive the circuit of FIG. 8.

FIG. 10 therefore shows a circuit that can drive the hysteresis increase. The amplitude of the hysteresis (voltage $V_h$ in FIG. 9) should be increased when it occurs a switch-on period $T_{ON2}$ of the second converter. $Q_1$ is the output of the driver 20, following the comparator 11 in the loop, that declares the switch-on period Ton of the first converter $10_1$, thus the NOR gate 56 is enabled by such signal Q1. Also the amplitude of the hysteresis should be maintained increased for the switch-on period $T_{ON1}$ of the first converter if the two converters have their switch-on periods $T_{ON1}$ and $T_{ON2}$ overlapping. This is obtained by means of the set-reset circuit 55 which is reset on the front edge of the signal from the comparator 11 (taken at the output of driver 20) of the loop masked by the signal $Q_2$, i.e., the switch-on period $T_{ON2}$, of the second converter, and resets on the front edge of the switch-off period $T_{off}$ (NOT($T_{ON}$)). A dual circuit is provided on the second converter to implement a dual procedure.

In FIGS. 5A and 5B are shown two control circuits $40_1$ and $40_2$ which include respective logic circuit $50_1$ and $50_2$, receiving the PWM signal $Q_1$ and $Q_2$ and issuing increase hysteresis signal Trh, nTrh, to respective actuation circuit $30_1$ and $30_2$ which regulate the hysteresis amplitude $V_{HYST1}$ and $V_{HYST2}$ of the respective converters $10_1$ and $10_2$.

When the switch on period $T_{ON}$ of one of the regulators has been triggered by the PWM signal Q the hysteresis of the other regulator is slightly increased. In this way the switching on of the second converter $10_2$ is less probable, becoming more noise insensitive. The same circuit, with swapped control signals, is in the first converter $10_1$ to prevent undesired high side switch-on, triggered by the switching activity of the second converter $10_2$.

The method according to the various embodiments here described is presents the advantage, with respect to solutions like the one adding a clock, that both the converters, or regulators, are working as a proper hysteretic DC-DC converter and for this reason the transient current load response is very fast. At the same time, the hysteresis increasing method allows to distribute the regulator switch-on period along the total switching period.

Of course, without prejudice to the principle of the embodiments, the details of construction and the embodiments may vary widely with respect to what has been described and illustrated herein purely by way of example, without thereby departing from the scope of the present embodiments.

Although the solution has been described with reference to crossing or reaching a lower hysteresis threshold to enable the switch-on period, it is clear that dual solutions where the lower hysteresis threshold is substituted by the higher hysteresis threshold and the voltage increases and reductions are substituted by their dual are possible, for instance in case of operation with negative voltages.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
managing a plurality of hysteretic DC-DC buck converters, each including a hysteretic comparator operating according to a respective hysteresis window, for each of the hysteretic DC-DC buck converters the managing including:
verifying if a respective feedback voltage of the hysteretic DC-DC buck converter reaches a lower threshold in order to enter a switch-on period of the hysteretic DC-DC buck converter,
detecting if an other hysteretic DC-DC buck converter in said plurality of hysteretic DC-DC buck converters has entered a respective switch-on period,
in response to detecting that the other hysteretic DC-DC buck converter in said plurality of hysteretic DC-DC buck converters has entered the respective switch-on period, entering a hysteresis voltage adjustment procedure that includes increasing an amplitude of the hysteresis window of the hysteretic DC-DC buck converter.

2. The method according to claim 1, wherein increasing the amplitude of the hysteresis window of the hysteretic DC-DC buck converter includes reducing a lower threshold of the hysteresis window of the hysteretic DC-DC buck converter.

3. The method according to claim 2, wherein said hysteresis voltage adjustment procedure includes for each hysteretic DC-DC buck converter, after increasing the amplitude of the hysteresis window:
verifying if the feedback voltage of the hysteretic DC-DC buck converter now reaches the lower threshold, and
increasing a higher threshold of the hysteresis window in response to verifying that the feedback voltage of the hysteretic DC-DC buck converter has reached the lower threshold.

4. The method according to claim 3, wherein for each hysteretic DC-DC buck converter:
subsequently verifying if the switch-on period of the other hysteretic DC-DC buck converter is complete; and
restoring the lower threshold of the hysteretic DC-DC buck converter in response to subsequently verifying that the switch-on period of the other hysteretic DC-DC buck converter is complete.

5. The method according to claim 3, wherein for each hysteretic DC-DC buck converter:
subsequently verifying if the switch-on period of the other hysteretic DC-DC buck converter is complete; and
restoring the lower threshold in response to verifying that the feedback voltage of the hysteretic DC-DC buck converter has not reached the lower threshold and subsequently verifying that the switch-on period of the other hysteretic DC-DC buck converter is complete.

6. The method according to claim 2, wherein for each hysteretic DC-DC buck converter, said hysteresis voltage adjustment procedure includes:
detecting if a further converter, different from said other converter, has entered a respective switch-on period; and
performing a further instance of the hysteresis voltage adjustment procedure in response to detecting that the further converter has entered the respective switch-on period.

7. The method according to claim 6, wherein, for each hysteretic DC-DC buck converter, performing the further instance of the hysteresis voltage adjustment procedure includes increasing a higher threshold of the hysteresis window of the hysteretic DC-DC buck converter.

8. The method according to claim 1, wherein the hysteretic DC-DC buck converters create plural output voltages, respectively, and respectively provide the plural output voltages to respective loads.

9. A method, comprising:
managing a plurality of hysteretic DC-DC buck converters, each including a hysteretic comparator operating according to a respective hysteresis window, for each of the hysteretic DC-DC buck converters the managing including:
verifying if a respective feedback voltage of the hysteretic DC-DC buck converter reaches a lower threshold in order to enter a switch-on period of the hysteretic DC-DC buck converter,
detecting if an other hysteretic DC-DC buck converter in said plurality of hysteretic DC-DC buck converters has entered a respective switch-on period,
in response to detecting that the other hysteretic DC-DC buck converter in said plurality of hysteretic DC-DC buck converters has entered the respective switch-on period, changing an amplitude of the hysteresis window of the hysteretic DC-DC buck converter.

10. The method according to claim 9, wherein changing the amplitude of the hysteresis window of the hysteretic DC-DC buck converter includes changing a lower threshold of the hysteresis window of the hysteretic DC-DC buck converter.

11. The method according to claim 10, wherein said hysteresis voltage adjustment procedure includes for each hysteretic DC-DC buck converter, after changing the amplitude of the hysteresis window:
verifying if the feedback voltage of the hysteretic DC-DC buck converter now reaches the lower threshold, and
changing a higher threshold of the hysteresis window in response to verifying that the feedback voltage of the hysteretic DC-DC buck converter has reached the lower threshold.

12. The method according to claim 11, wherein for each hysteretic DC-DC buck converter:
subsequently verifying if the switch-on period of the other hysteretic DC-DC buck converter is complete; and
restoring the lower threshold of the hysteretic DC-DC buck converter in response to subsequently verifying that the switch-on period of the other hysteretic DC-DC buck converter is complete.

13. The method according to claim 11, wherein for each hysteretic DC-DC buck converter:
- subsequently verifying if the switch-on period of the other hysteretic DC-DC buck converter is complete; and
- restoring the lower threshold in response to verifying that the feedback voltage of the hysteretic DC-DC buck converter has not reached the lower threshold and subsequently verifying that the switch-on period of the other hysteretic DC-DC buck converter is complete.

14. The method according to claim 10, wherein for each hysteretic DC-DC buck converter, said hysteresis voltage adjustment procedure includes:
- detecting if a further converter, different from said other converter, has entered a respective switch-on period; and
- performing a further instance of the hysteresis voltage adjustment procedure in response to detecting that the further converter has entered the respective switch-on period.

15. The method according to claim 14, wherein, for each hysteretic DC-DC buck converter, performing the further instance of the hysteresis voltage adjustment procedure includes changing a higher threshold of the hysteresis window of the hysteretic DC-DC buck converter.

16. The method according to claim 9, wherein the hysteretic DC-DC buck converters provide a common supply current to a common load.

17. A DC-DC buck converter system, comprising:
- a plurality of hysteretic DC-DC buck converters each including a hysteretic comparator configured to operate according to a respective hysteresis window; and
- a plurality of control circuits coupled to the hysteretic DC-DC buck converters, respectively, each control circuit being configured to manage the respective hysteretic DC-DC buck converter by a method that includes:
  - verifying if a respective feedback voltage of the hysteretic DC-DC buck converter reaches a lower threshold in order to enter a switch-on period of the hysteretic DC-DC buck converter,
  - detecting if an other hysteretic DC-DC buck converter in said plurality of hysteretic DC-DC buck converters has entered a respective switch-on period,
  - in response to detecting that the other hysteretic DC-DC buck converter in said plurality of hysteretic DC-DC buck converters has entered the respective switch-on period, entering a hysteresis voltage adjustment procedure that increases an amplitude of the hysteresis window of the hysteretic DC-DC buck converter.

18. The DC-DC buck converter system according to claim 17, wherein each control circuit is configured to increase the amplitude of the hysteresis window of the hysteretic DC-DC buck converter by reducing a lower threshold of the hysteresis window of the hysteretic DC-DC buck converter.

19. The DC-DC buck converter system according to claim 18, wherein each control circuit comprises:
- an actuation circuit configured to increase the amplitude of the hysteresis window of the respective hysteretic DC-DC buck converter; and
- a synchronizing logic circuit to detect reaching of the switch on period of the other converter in said plurality of converters, said synchronizing logic circuit being configured to command the actuation circuit to increase the amplitude of the hysteresis window of the respective hysteretic DC-DC buck converter.

20. The DC-DC buck converter system according to claim 19, wherein said synchronizing logic circuit is configured to receive PWM signals of the plurality of converters, detect the reaching of the switch on period of the other converter from said PWM signals, and issue activation signals that cause the actuation circuit to increase said amplitude of the hysteresis window of the respective hysteretic DC-DC buck converter from a normal value to an enlarged value.

21. The DC-DC buck converter according to claim 17, wherein said plurality of hysteretic DC-DC buck converters is arranged on a same chip or die.

* * * * *